(12) United States Patent
Thacker et al.

(10) Patent No.: US 12,346,228 B2
(45) Date of Patent: Jul. 1, 2025

(54) METHODS AND ELECTRONIC DEVICE FOR REPAIRING MEMORY ELEMENT IN MEMORY DEVICE

(71) Applicant: SAMSUNG ELECTRONICS CO., LTD., Suwon-si (KR)

(72) Inventors: Helik Kanti Thacker, Bengaluru (IN); Adrita Barari, Bengaluru (IN); Akhilesh Sudhir Patankar, Bengaluru (IN); Deokgu Yoon, Suwon-si (KR); Damini, Bengaluru (IN); Keerthi Kiran Jagannathachar, Bengaluru (IN); Paulami Das, Bengaluru (IN); Sairam Jujjarapu, Bengaluru (IN); Sudhanshu Gupta, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 3 days.

(21) Appl. No.: 18/218,893

(22) Filed: Jul. 6, 2023

(65) Prior Publication Data
US 2024/0012726 A1      Jan. 11, 2024

(30) Foreign Application Priority Data

Jul. 7, 2022 (IN) .............................. 202241039228
Jun. 17, 2023 (IN) .............................. 202241039228

(51) Int. Cl.
| G06F 11/00 | (2006.01) |
| G06F 11/22 | (2006.01) |
| G06N 3/04 | (2023.01) |
| G06N 3/092 | (2023.01) |

(52) U.S. Cl.
CPC ........... *G06F 11/2263* (2013.01); *G06N 3/04* (2013.01); *G06N 3/092* (2023.01)

(58) Field of Classification Search
CPC .................................................. G06F 11/2263
USPC ......................................................... 714/1–57
See application file for complete search history.

(56) References Cited

U.S. PATENT DOCUMENTS

| 6,442,663 B1* | 8/2002 | Sun ........................... G06F 9/54 |
| | | 711/202 |
| 2004/0163015 A1* | 8/2004 | Nadeau-Dostie ...... G11C 29/44 |
| | | 714/42 |
| 2011/0289351 A1* | 11/2011 | Rashmi ............... H03M 13/616 |
| | | 714/6.32 |
| 2020/0409931 A1* | 12/2020 | Zang ................... G06F 16/2365 |

(Continued)

FOREIGN PATENT DOCUMENTS

WO      2021/206827 A1      10/2021

*Primary Examiner* — Sarai E Butler
(74) *Attorney, Agent, or Firm* — Sughrue Mion, PLLC

(57) ABSTRACT

A method for repairing a memory element in a memory device by an electronic device includes configuring a memory element as a graph with a vertex and an edge, a node associated with the memory element being encoded with information related to a fault, determining, from the graph, a repair policy using a probability distribution over one or more of a faulty line and a non-faulty line as predicted by a graph neural network (GNN) based on a final node feature value from message passing stages of the GNN, and determining a value of a state using a probability of the memory element being repaired from a particular state based on a global mean of all the final node feature values predicted by the GNN.

15 Claims, 16 Drawing Sheets

(56) References Cited

U.S. PATENT DOCUMENTS

| | | | |
|---|---|---|---|
| 2022/0138115 A1* | 5/2022 | Klaedtke | G06F 12/1425 |
| | | | 711/163 |
| 2023/0019575 A1 | 1/2023 | Thacker et al. | |
| 2023/0096290 A1* | 3/2023 | Garapati | H04L 41/145 |
| | | | 714/4.1 |
| 2023/0176941 A1* | 6/2023 | Lin | G06N 3/09 |
| 2023/0237047 A1* | 7/2023 | Trigonakis | G06F 16/2379 |
| | | | 707/703 |

* cited by examiner

Chip

$X_8$ $$\begin{bmatrix} 1.00 \\ 0.33 \\ 1.00 \\ 1.00 \\ 1.50 \end{bmatrix}$$

METHODS AND ELECTRONIC DEVICE FOR REPAIRING MEMORY ELEMENT IN MEMORY DEVICE

CROSS REFERENCE TO RELATED APPLICATIONS

This application is based on and claims priority to Indian Provisional Application No. 202241039228, filed Jul. 7, 2022 in the Indian Patent Office, and Indian Complete Application No. 202241039228, filed Jun. 17, 2023 in the Indian Patent Office, the contents of each of which being incorporated by reference herein in their entireties.

BACKGROUND

The present disclosure relates to management of defects in memories, and more particularly, to methods and an electronic device for repairing defects/faults in the memories using a neural network.

Memory manufacturers have been able to keep up with Moore's Law by increasing memory densities and decreasing node sizes in semiconductor devices (aka "semiconductor chips") which have led to an increased probability of memory defects and reduced wafer yield.

SUMMARY

According to an aspect of one or more embodiments, there is provided a method comprising configuring, by an electronic device, a memory element as a graph with at least one vertex and at least one edge, at least one node associated with the memory element being encoded with information of at least one of a fault, a degree of the fault in a row of the memory element, a degree of the fault in a column of the memory element, a degree of spare rows available in the memory element, and a degree of spare columns available in the memory element; determining, from the graph by the electronic device, a repair policy using a probability distribution over at least one of a faulty line and a non-faulty line as predicted by a graph neural network (GNN) based on a final node feature value from message passing stages of the GNN; and determining, by the electronic device, a value of a state using a probability of the memory element being repaired from a particular state based on a global mean of all the final node feature values predicted by the GNN.

According to an aspect of one or more embodiments, there is provided an electronic device comprising a processor; a memory; and a memory element repairing controller coupled with the processor and the memory, the memory element repairing controller configured to at least configure a memory element as a graph with at least one vertex and at least one edge, at least one node associated with the memory element being encoded with information of at least one of a fault, a degree of the fault in a row of the memory element, a degree of the fault in a column of the memory element, a degree of spare rows available in the memory element, and a degree of spare columns available in the memory element; determine, from the graph, a repair policy using a probability distribution over at least one of a faulty line and a non-faulty line as predicted by a graph neural network (GNN) based on a final node feature value; and determine a value of a state using a probability of the memory element being repaired from a particular state based on a global mean of all the final node feature values predicted by the GNN.

According to an aspect of one or more embodiments, there is provided a method comprising detecting, by an electronic device, at least one faulty row and at least one column to be repaired in a memory element; configuring, by the electronic device, the memory element as a graph with at least one vertex and at least one edge, at least one node associated with the memory element being encoded with information of at least one of a fault, a degree of the fault in a row of the memory element, a degree of the fault in a column of the memory element, a degree of spare rows available in the memory element, and a degree of spare columns available in the memory element; and repairing, by the electronic device, the memory element in a memory device based on the information.

According to an aspect of one or more embodiments, there is provided an electronic device comprising a processor; a memory; and a memory element repairing controller coupled with the processor and the memory, the memory element repairing controller configured to at least detect at least one faulty row and at least one column to be repaired in the memory element; configure the memory element as a graph with at least one vertex and at least one edge, at least one node associated with the memory element being encoded with information of at least one of a fault, a degree of the fault in a row of the memory element, a degree of the fault in a column of the memory element, a degree of spare rows available in the memory element, and a degree of spare columns available in the memory element; and repair the memory element in a memory device based on the information.

BRIEF DESCRIPTION OF FIGURES

Various embodiments will be better understood from the following description with reference to the drawings, in which:

FIG. 8A-FIG. 8C are example illustrations in which an electronic device repairs a memory element in a memory device, according to some embodiments;

DETAILED DESCRIPTION

Figure 1:
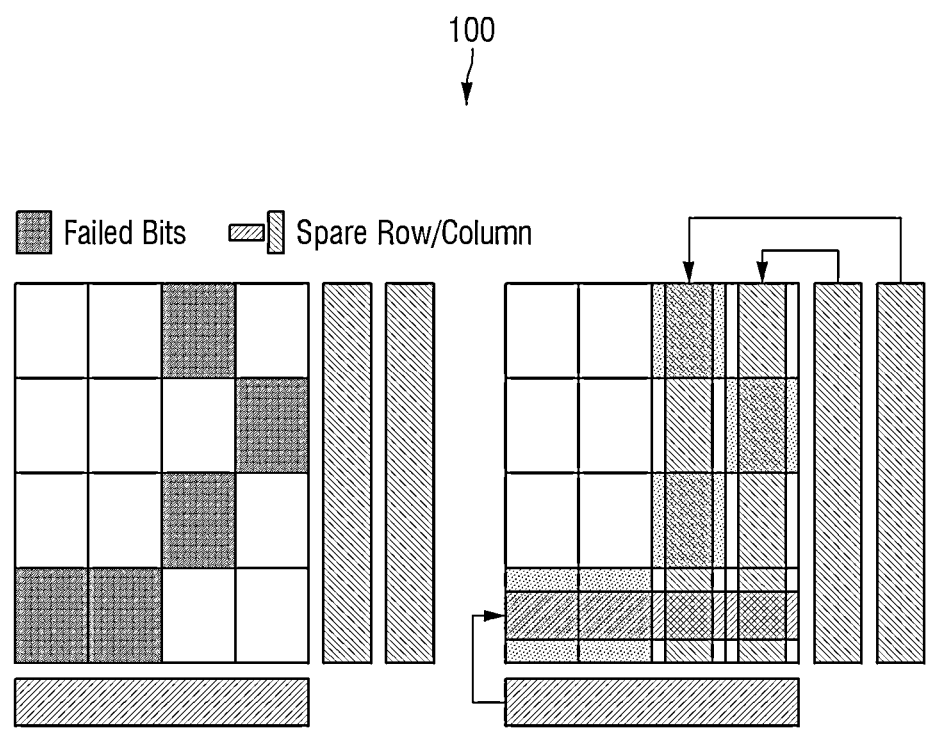
FIG. 1 depicts a redundancy analysis for allocation of spares/redundancies for repairing faulty lines in a memory chip, according to the related art.

In order to compensate for a yield decrease mentioned above, manufacturers have included redundancies in the form of spares, so that defective semiconductor devices (i.e., "defective chips") can be repaired. The addition of redundancies increases the chip size, but the ability to repair using the redundant spares allows a higher memory yield. Cold and Hot wafer tests may locate an exact address of a defect which exact address is used to perform a Redundancy Analysis (RA). FIG. 1 depicts a redundancy analysis for allocation of spares/redundancies for repairing faulty lines in a memory chip, according to the related art. As illustrated in FIG. 1, a RA (100) is the process of allocating spare rows and spare columns to the defective rows and the defective columns in the chips.

The RA is the process of mapping the spare rows and columns to repair faulty lines in the defective chip. The redundancy analysis problem is an nondeterministic polynomial (NP) Complete problem. In the related art, the redundancy analysis problem is solved with existing Heuristic and Exhaustive techniques. The Heuristic techniques (e.g., Broadside, Repair-Most, Largest Effective Coefficient Algorithm (LECA), One Side Pivot (OSP) techniques or the like) currently used for memory repair are designed with certain insights in mind such as patterns of faulty rows and columns. The Heuristic techniques are time efficient but have sub-optimal repair rates. Exhaustive techniques (e.g., Faulty Line Covering Algorithm (FLCA)) achieve optimal repair rates but with exponential time complexities. The motivation for exploring a Reinforcement Learning (RL) approach for the RA is driven by the fact that the RL approach allows an agent to self-discover unconventional strategies, without requiring insights into fault patterns, and the agent learns to repair the chip without any design insights or handcrafted rules.

Figure 2:
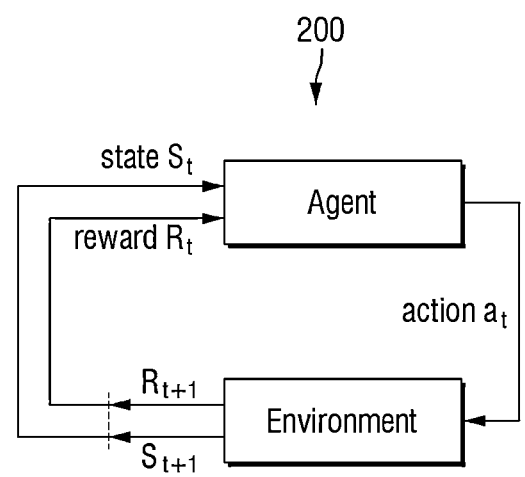
FIG. 2 depicts an environment, state, an agent, reward in a Reinforcement learning paradigm, according to the related art.

FIG. 2 depicts an environment, state, an agent, and a reward in a Reinforcement learning paradigm (200), according to the related art. The Reinforcement learning paradigm (200) is operated in the form of loop.

The Reinforcement Learning (RL) paradigm (200) can perform the allocation of rows and columns without needing handcrafted rules. The agent takes an action at a state St and receives a reward Rt. The agent then learns to perform the task by taking a sequence of actions, which maximizes cumulative rewards, without any guidance on how to perform the task. This configuration helps in the discovery of previously unseen strategies, which may not have been covered by design insights or rules. However, the RL paradigm (200) involves a heavy compute load (i.e., requires many resources) and requires much time to perform the sequence of actions to arrive at the maximized cumulative reward.

It is advantageous to address the above mentioned disadvantages or other short comings or at least provide a useful alternative.

Accordingly, it is an aspect of the present disclosure to provide methods and electronic devices for pre-package memory repair, where a scalable form of AlphaRA uses Graph Neural Networks (GNNs), which enables use of variable sized input (chip size) with no limitations of the number of edges/nodes, and the trained SAZRA (i.e., Scalable AlphaRA) model can then be used to test on chips of larger sizes, overcoming the heavy compute and time requirements of related art methods.

Accordingly, various embodiments herein provide methods for repairing a memory element in a memory device. The method may include configuring, by an electronic device, the memory element as a graph with at least one vertex and at least one edge. At least one node may be associated with the memory element encoded with information of at least one of a fault, a degree of the fault in a row of the memory element, a degree of the fault in a column of the memory element, a degree of spare rows available in the memory element, and a degree of spare columns available in the memory element. The method may include determining, by the electronic device, a repair policy using a probability distribution over at least one of a faulty line and a non-faulty line as predicted by a GNN based on a final node feature value from a message passing stages of the GNN upon configuring the memory element as the graph with the at least one vertex and the at least one edge. The method may include determining, by the electronic device, a value of a state using probability of the memory element getting repaired from a particular state based on a global mean of all the final node feature values predicted by the GNN to obtain a single scalar value.

In some embodiments, the method may include generating, by the electronic device, a dataset for training the GNN by performing self-play events. The method may include determining, by the electronic device, a new state based on an action taken and re-computing the repair policy until the spare rows available in the memory element and the spare columns available in the memory element are exhausted or a number of faults in the memory element are zero. The method may include selecting, by the electronic device, a trained neural network from a plurality of trained neural networks using a set of custom rules. The set of custom rules may be based on a number of memory elements repaired in a validation dataset and the number of spares used by each competing neural network. The method may include detecting, by the electronic device, the faulty rows and the faulty columns using the selected trained neural network and mapping the faulty rows and the faulty columns to spare rows and spare columns available to repair the memory element during a repair phase.

In some embodiments, determining, by the electronic device, the repair policy using probability distribution over at least one of the faulty line and the non-faulty line as predicted by the GNN based on the final node feature value may include generating a dataset for training the GNN by performing self-play events using a Monte Carlo Tree Search (MCTS) over training iterations, training the GNN from the dataset collected from the self-play events, where the GNN takes a state of the memory element as an input and provides at least one output, and determining the repair policy using probability distribution over at least one of the faulty line and the non-faulty line as predicted by the trained GNN.

In some embodiments, the generated dataset may include at least one of a state of the memory element, a policy associated with the memory element and a value associated with the memory element.

In some embodiments, the at least one output may include a value of state and a vector of action probabilities or policy of length.

In some embodiments, configuring, by the electronic device, the memory element as the graph with the at least one vertex and the at least one edge may include detecting at least one faulty row and at least one faulty column to be repaired in the memory element, and configuring the memory element as the graph with the at least one vertex and the at least one edge based on the detection.

In some embodiments, the repair policy may be determined by using a MCTS and the GNN.

Accordingly, various embodiments herein provide an electronic device including a memory element repairing controller coupled with a processor and a memory. The memory element repairing controller may be configured to configure a memory element as a graph with at least one vertex and at least one edge. At least one node may be associated with the memory element encoded with information of at least one of a fault, a degree of the fault in a row of the memory element, a degree of the fault in a column of the memory element, a degree of spare rows available in the memory element and a degree of spare columns available in the memory element. The memory element repairing controller may be configured to determine a repair policy using probability distribution over at least one of a faulty line and a non-faulty line as predicted by a GNN based on a final node feature value upon configuring the memory element as the graph with the at least one vertex and the at least one edge. The memory element repairing controller may be configured to determine a value of a state using probability of the memory element getting repaired from a particular state based on a global mean of all the final node feature values predicted by the GNN to obtain a single scalar value.

Accordingly, various embodiments herein provide methods for repairing a memory element in a memory device. The method may include detecting, by an electronic device, at least one faulty row and at least one column to be repaired in the memory element. Further, the method includes configuring, by the electronic device, the memory element as a graph with at least one vertex and at least one edge. At least one node may be associated with the memory element encoded with information of at least one of a fault, a degree of the fault in a row of the memory element, a degree of the fault in a column of the memory element, a degree of spare rows available in the memory element and a degree of spare columns available in the memory element. The method may include repairing, by the electronic device, the memory element in the memory device based on the information.

Accordingly, various embodiments herein provide an electronic device including a memory element repairing controller coupled with a processor and a memory. The memory element repairing controller may be configured to detect at least one faulty row and at least one column to be repaired in the memory element. The memory element repairing controller may be configured to configure the memory element as a graph with at least one vertex and at least one edge. At least one node associated with the memory element may be encoded with information of at least one of a fault, a degree of the fault in a row of the memory element, a degree of the fault in a column of the memory element, a degree of spare rows available in the memory element and a degree of spare columns available in the memory element. The memory element repairing controller may be configured to repair the memory element in the memory device based on the information.

These and other aspects of various embodiments herein will be better appreciated and understood when considered in conjunction with the following description and the accompanying drawings. It should be understood, however, that the following descriptions, while indicating various embodiments and numerous specific details thereof, are given by way of illustration and not of limitation. Many changes and modifications may be made within the scope of the various embodiments herein without departing from the spirit thereof, and the various embodiments herein as well as the appended claims include all such modifications.

The embodiments disclosed herein are illustrated in the accompanying drawings, throughout which like reference letters indicate corresponding parts in the various figures. As used in this specification, the phrase "at least one of A, B, and C" includes within its scope "only A", "only B", "only C", "both A and B", "both B and C", "both A and C", and "all of A, B, and C".

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Various embodiments herein achieve methods for repairing a memory element in a memory device. The method may include configuring, by an electronic device, the memory element as a graph with at least one vertex and at least one edge. At least one node may be associated with the memory element encoded with information of at least one of a fault, a degree of the fault in a row of the memory element, a degree of the fault in a column of the memory element, a degree of spare rows available in the memory element and a degree of spare columns available in the memory element. The method may include determining, by the electronic device, a repair policy using a probability distribution over at least one of a faulty line and a non-faulty line as predicted by a GNN based on a final node feature value from a message passing stages of the GNN upon configuring the memory element as the graph with the at least one vertex and the at least one edge. The method may include determining, by the electronic device, a value of a state using probability of the memory element getting repaired from a particular state based on a global mean of all the final node feature values predicted by the GNN to obtain a single scalar value.

The method can be used to repair a pre-package memory using Graph Neural Networks (GNNs). The GNNs enable use of variable sized input (chip size) with no limitations of the number of edges/nodes, and the trained graph neural network (GNN) model can then be used to test chips of larger sizes, overcoming the heavy compute and time requirements of related art methods. Thus, the method according to various embodiments results in repairing the memory element in the memory device in a low cost and requiring less time.

The method can be used to improve the efficiency of training a model by training just once on a smaller chip size and the trained model can be used for repair on bigger chip sizes. By using Graph Neural Networks in AlphaRA, the method can be trained on smaller DRAM chips and the strategies can be transferred to larger DRAM chips, without significant loss of yield. Further adding multithreaded Monte Carlo Tree Search (MCTS) and supervised training enables scaling AlphaRA to the sizes of real DRAM chips.

The method can be used to repair the defects/faults in memories using a scalable AlphaZero based solution in a low cost and requiring less time. The AlphaZero based solution is a game-playing technique that, through a combination of self-play and neural network reinforcement learning is able to learn to play games such as chess and Go from scratch—after being fed nothing more than the rules of the games.

Referring now to the drawings, and more particularly to FIGS. 3 through 10, where the same reference characters denote corresponding features consistently throughout the figures, there are shown various embodiments.

Figure 3:
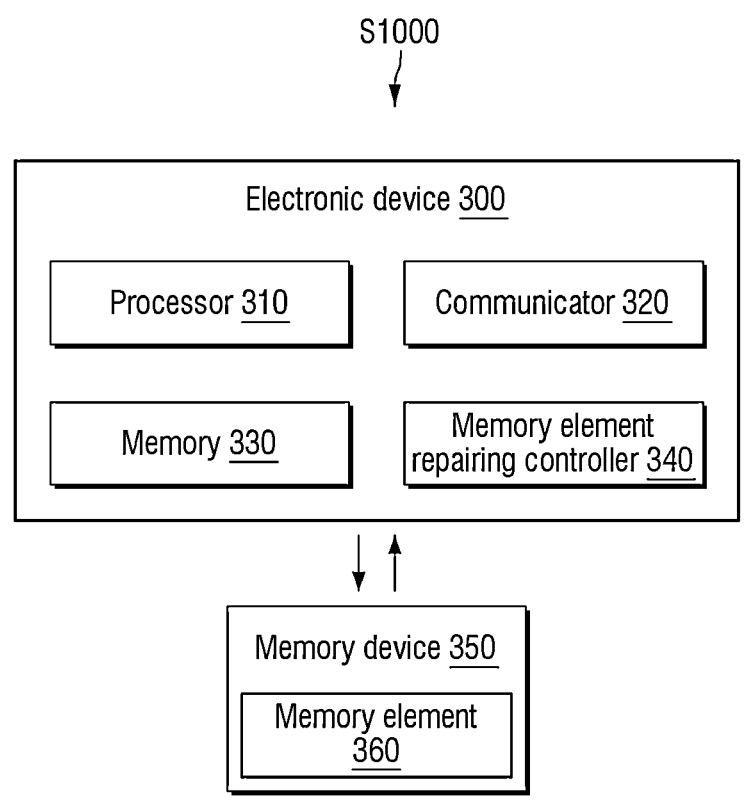
FIG. 3 illustrates an electronic device for repairing a memory element in a memory device, according to some embodiments.

FIG. 3 illustrates an electronic device for repairing a memory element (360) in a memory device (350), according to some embodiments. The electronic device (300) may repair a memory element (360) in a memory device (350). The memory element (360) is any smallest part of the memory device (350) and possesses more than one stable state. The memory element (360) assists to store the information in the memory device (350). Also, the memory element (360) has one or more spare rows and one or more spare columns. The interaction of the electronic device (300) and the memory device (350) form a system (S1000). The electronic device (300) can be, for example, but is not limited to, a laptop, a smart phone, a desktop computer, a notebook, a Device-to-Device (D2D) device, a vehicle to everything (V2X) device, a foldable phone, a smart TV, a tablet, an immersive device, a server, and an internet of things (IoT) device. The memory device (350) can be, for example, but is not limited to, a dynamic random access memory (DRAM), a static random access memory (SRAM), a read-only memory (ROM), an erasable programmable ROM, a flash memory, a hard disk, an optical disk, a solid state device, or the like.

In some embodiments, the electronic device (300) includes a processor (310), a communicator (320), a memory (330) and a memory element repairing controller (340). The processor (310) is coupled with the communicator (320), the memory (330) and the memory element repairing controller (340).

The memory element repairing controller (340) detects one or more faulty row(s) and one or more faulty column(s) to be repaired in a memory element (360). Based on the detection, the memory element repairing controller (340) configures the memory element (360) as a graph with one or more vertices and one or more edges. A node associated with the memory element (360) is encoded with information of at least one of a fault, a degree of the fault in a row of the memory element (360), a degree of the fault in a column of the memory element (360), a degree of spare rows available in the memory element (360), and a degree of spare columns available in the memory element (360). The node is formed by using the one or more vertices and the one or more edges.

The memory element repairing controller (340) determines a repair policy using a probability distribution over all faulty lines and all non-faulty lines as predicted by a Graph Neural Network (GNN) based on a final node feature value from the message passing stages of the GNN and then as predicted by the linear (fully-connected) layers of the graph neural network (GNN) upon configuring the memory element (360) as the graph with the one or more vertices and the one or more edges. In some embodiments, the memory element repairing controller (340) determines a repair policy using a probability distribution over all faulty lines as predicted by a GNN based on the final node feature value from the message passing stages of GNN and then as predicted by the linear (fully-connected) layers of a graph neural network (GNN) upon configuring the memory element (360) as the graph with the one or more vertices and the one or more edges. In some embodiments, the memory element repairing controller (340) determines the repair policy using a probability distribution over all non-faulty lines as predicted by the GNN based on the final node feature value upon configuring the memory element (360) as the graph with the one or more vertices and the one or more edges. The repair policy is determined by using a MCTS and a GNN. The MCTS and the GNN are operated based on the existing mechanisms.

In some embodiments, the memory element repairing controller (340) generates a dataset for training the GNN by performing self-play events using the MCTS over training iterations. The dataset includes a state of the memory element (360), a policy associated with the memory element (360), and a value associated with the memory element (360). The memory element repairing controller (340) trains the GNN from the dataset collected from self-play events, where the GNN takes a state of the memory element (360) as an input and provides one or more outputs. The output includes a value of a state and a vector of action probabilities or a policy of length. The policy of length means a number of actions in the memory repair. The policy of length is also called as policy vector of length 2n where n is the size of the square chip. The policy vector of length may be equal to combination of the sum of number of rows and number of columns. The memory element repairing controller (340) determines the repair policy using a probability distribution over the faulty line and the non-faulty line as predicted by the trained GNN.

The memory element repairing controller (340) determines the value of the state using a probability of the memory element (360) getting repaired from the particular state based on a global mean of all the final node feature values predicted by the GNN to obtain a single scalar value by taking a mean of all final node feature values. The value is used to determine how likely chip is to get repaired from that state.

The memory element repairing controller (340) generates the dataset for training the GNN by performing self-play events. The memory element repairing controller (340) determines the new state based on the action taken and re-computing the repair policy until the spare rows available in the memory element (360) and the spare columns available in the memory element (360) are exhausted or until the number of faults in the memory element are zero.

The memory element repairing controller (340) selects the trained neural network from the plurality of trained neural networks using a set of custom rules, where the set of custom rules is based on a number of memory elements (360) repaired in a validation dataset and a number of spares used by each competing neural network.

The memory element repairing controller (340) detects the faulty rows and faulty columns using the selected trained neural network and maps the faulty rows and the faulty columns to spare rows and columns available to repair the memory element (360) during a repair phase.

In an example implementation, the memory element repairing controller (340) may detect defective areas or faults in a DRAM chip. The memory element repairing controller (340) detects the rows and columns to be masked in order to repair the DRAM chip and masks the rows and columns detected and repairing the DRAM chip. The masking or the repair methodology components comprise:

a) A state of the memory chip where the state is defined as the graph comprising of nodes which represent each cell of the semiconductor chip, wherein each node encodes the following information within itself: [If the cell is faulty or not, proportion of faults in the row, proportion of faults in the column, proportion of spare rows available, proportion of spare columns available].

b) A policy of a state defined as the probability distribution over faulty lines given by the Graph neural network (GNN).

c) A value of a state defined as probability of a chip getting repaired at given a particular state value given by the graph neural network.

d) An action defined as the process of selecting a particular row or column.

e) Every repair action leads to a new memory state and a change in the values of the node information.

The process of computing the probabilities and values for each action comprises using the state data as an input to the Monte Carlo Tree Search and Neural Network. The process of calculating the repair policy and value for a chip using a Monte Carlo Tree Search look ahead and is guided by the best trained Neural Network and defining the process of choosing the best trained neural network, taking an action by selecting the row or column to be repaired with the maximum probability based on the policy, and defining the new state based on the action taken and recalculating the repair policy until the spares are exhausted or the number of faults in the memory are 0.

The process of action masking for each state in the node in MCTS comprises determining for Must repair condition(s) wherein the must repair condition is defined as the number of faults in the row or the column exceeding the available number of spare columns or rows respectively, masking the actions representing rows and columns without the must repair conditions (given the must repair condition is satisfied), and masking the row and columns containing 0 faults (if there is no must repair condition).

In an example implementation, the method can be trained on smaller DRAM chips (N=16) and the same strategies transferred to larger DRAM chips (N=32, 64, 128, 256, 512).

In some embodiments, the memory element repairing controller (340) may be physically implemented by analog or digital circuits such as logic gates, integrated circuits, microprocessors, microcontrollers, memory circuits, passive electronic components, active electronic components, optical components, hardwired circuits, or the like, and may in some embodiments be driven by firmware.

The processor (310) is configured to execute instructions stored in the memory (330) and to perform various processes. The communicator (320) is configured for communicating internally between internal hardware components and with external devices via one or more networks. The memory (330) stores instructions to be executed by the processor (310). In some embodiments, the memory (330) may store computer code to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

At least one of the pluralities of modules/controller may be implemented through an Artificial intelligence (AI) model using a data driven controller (not shown). The data driven controller (not shown) can be a machine learning (ML) model based controller and AI model based controller. A function associated with the AI model may be performed through the non-volatile memory, the volatile memory, and the processor (310). The processor (310) may include one or a plurality of processors. One or a plurality of processors may be, for example, a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 3 shows various hardware components of the electronic device (300) it is to be understood that other embodiments are not limited thereto. In some embodiments, the electronic device (300) may include less or more number of components. The labels or names of the components are used only for illustrative purposes and do not limit the scope of the present disclosure or appended claims. One or more components can be combined together to perform same or substantially similar function in the electronic device (300).

Figure 4:
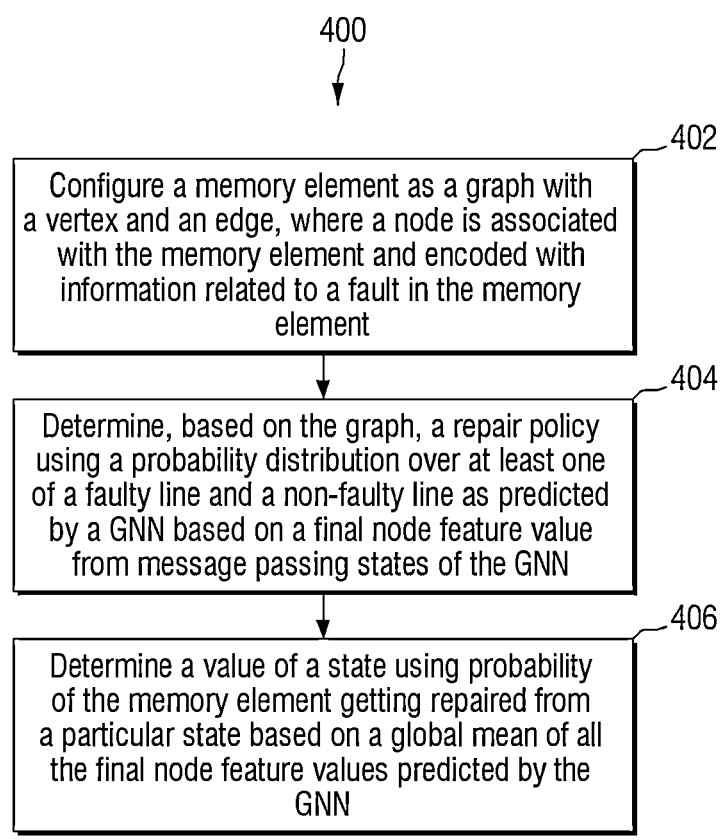
FIG. 4 and FIG. 5 are flow charts illustrating a method for repairing a memory element in a memory device, according to some embodiments.
Figure 5:
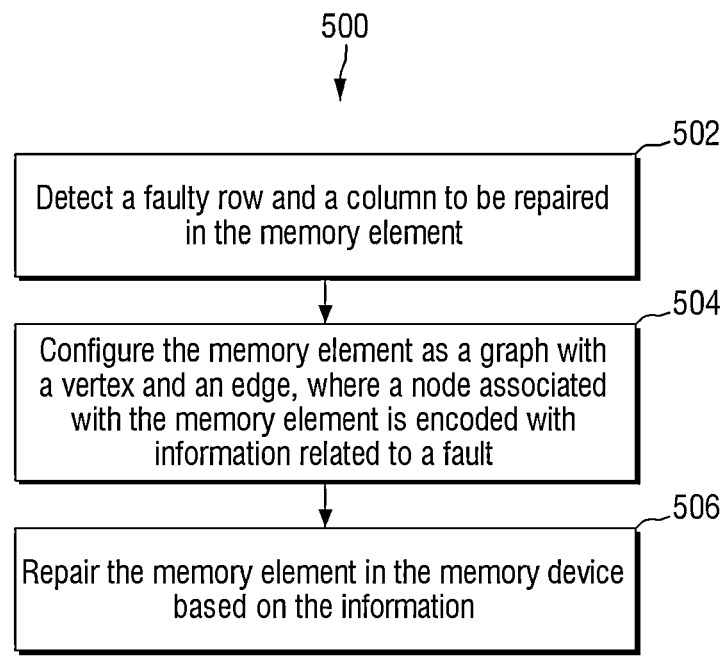

FIG. 4 and FIG. 5 are flow charts illustrating methods for repairing a memory element in a memory device, according to some embodiments.

As shown in FIG. 4, the operations (402-406) are performed by the memory element repairing controller (340). At step 402, the method includes configuring the memory element (360) as the graph with the vertex and the edge, where a node is associated with the memory element (360) and encoded with information related to a fault in the memory element (360). For example in some embodiments, the node is associated with the memory element (360) and encoded with information of at least one of the fault, the degree of the fault in the row of the memory element (360), the degree of the fault in the column of the memory element (360), the degree of spare rows available in the memory element (360) and the degree of spare columns available in the memory element (360).

At step 404, the method includes determining, based on the graph, a repair policy using a probability distribution over at least one of a faulty line and a non-faulty line as predicted by a GNN based on a final node feature value from message passing states of the GNN. For example, in some embodiments, the method may include determining the repair policy using the probability distribution over at least one of the faulty line and the non-faulty line as predicted by the GNN based on the final node feature value from the message passing stages of the GNN upon configuring the memory element (360) as the graph with the vertex and the edge.

At step 406, the method includes determining the value of the state using a probability of the memory element (360) getting repaired from the particular state based on the global mean of all the final node feature values predicted by the GNN. In some embodiments, the value may be a single scalar value.

As shown in FIG. 5, the operations (502-506) are performed by the memory element repairing controller (340). At step 502, the method includes detecting a faulty row and a column to be repaired in the memory element (360). At step 504, the method includes configuring the memory element (360) as the graph with a vertex and an edge. A node associated with the memory element (360) is encoded with information related to a fault. For example, in some embodiments, the memory element (360) is encoded with information of at least one of the fault, the degree of the fault in the row of the memory element (360), the degree of the fault in the column of the memory element (360), and the degree of spare rows available in the memory element (360) and the degree of spare columns available in the memory element (360). At step 506, the method includes repairing the memory element (360) in the memory device (350) based on the information.

Figure 6:
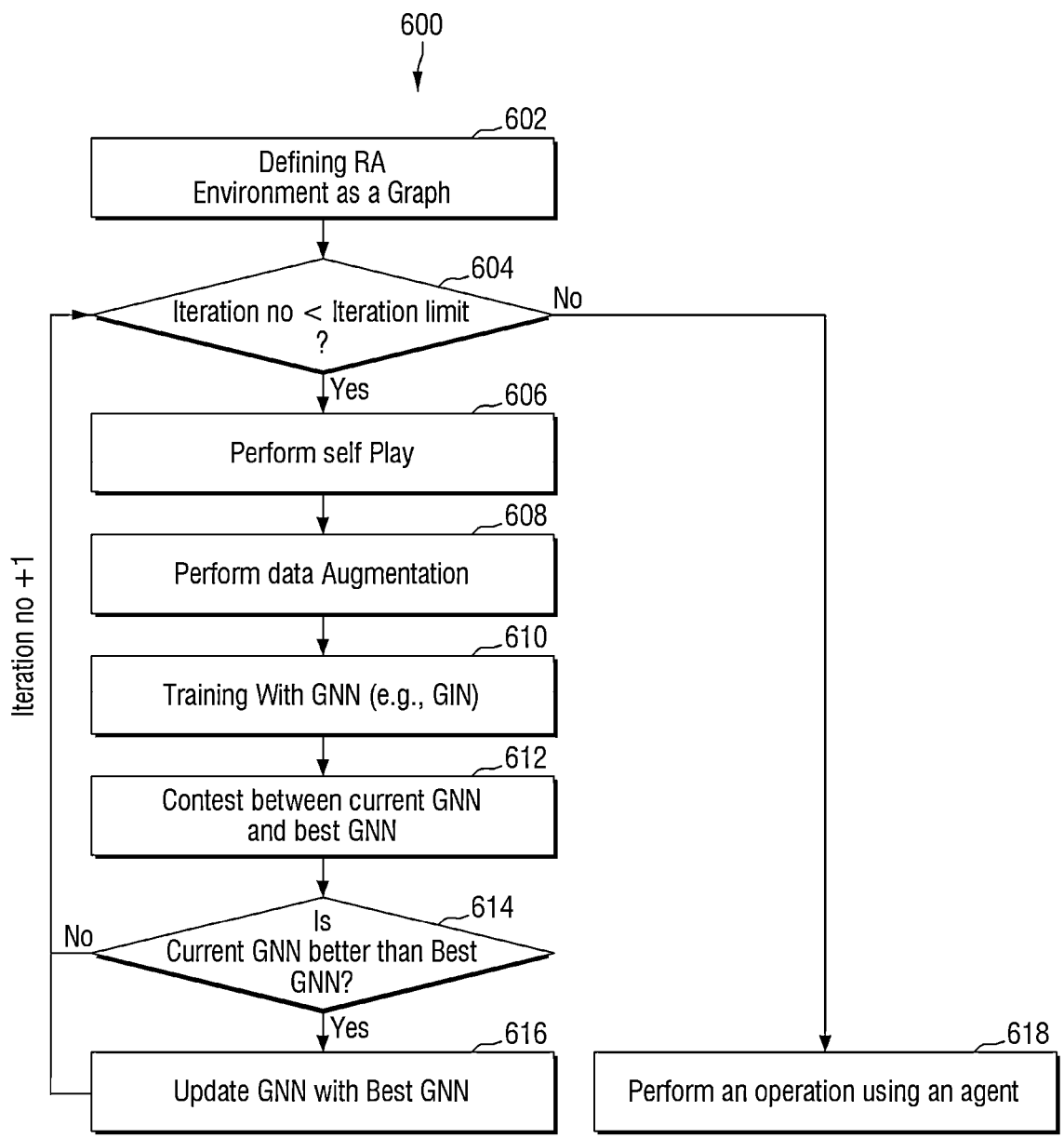
FIG. 6 is a flow chart illustrating a training process for repairing a memory element in a memory device, according to some embodiments.

FIG. 6 is a flow chart illustrating a training process for repairing a memory element in a memory device, according to some embodiments. As shown in FIG. 6, a flow chart (600) includes operations (602-618) which are performed by the memory element repairing controller (340) with help of a data driven controller.

At step 602, the method includes defining an RA environment as a graph. At step 604, the method includes determining whether an iteration number is less than an iteration limit. Upon determining the iteration number is less than the iteration limit (step 604, Yes), at step 606, the method includes performing self-play. At step 608, the method includes performing data augmentation. At step 610, the method includes training with the GNN (e.g., GIN or the like).

At step 612, the method includes contesting between a current GNN and a best GNN. At step 614, the method includes determining whether the current GNN is better than the best GNN. Upon determining that the current GNN is not better than the best GNN (step 612, No), the iteration number is increased and the method returns to step 604. Upon determining that the current GNN is better than the best GNN (step 612, Yes), at step 616, the method includes updating the GNN with the best GNN. The iteration number is increased and the method returns to step 604. At step 604, upon determining that the iteration number is not less than the iteration limit (step 604, No), the method proceeds to step 618. At step 618, the method includes performing the operation using the agent (e.g., SAZRA agent or the like).

Figure 7:
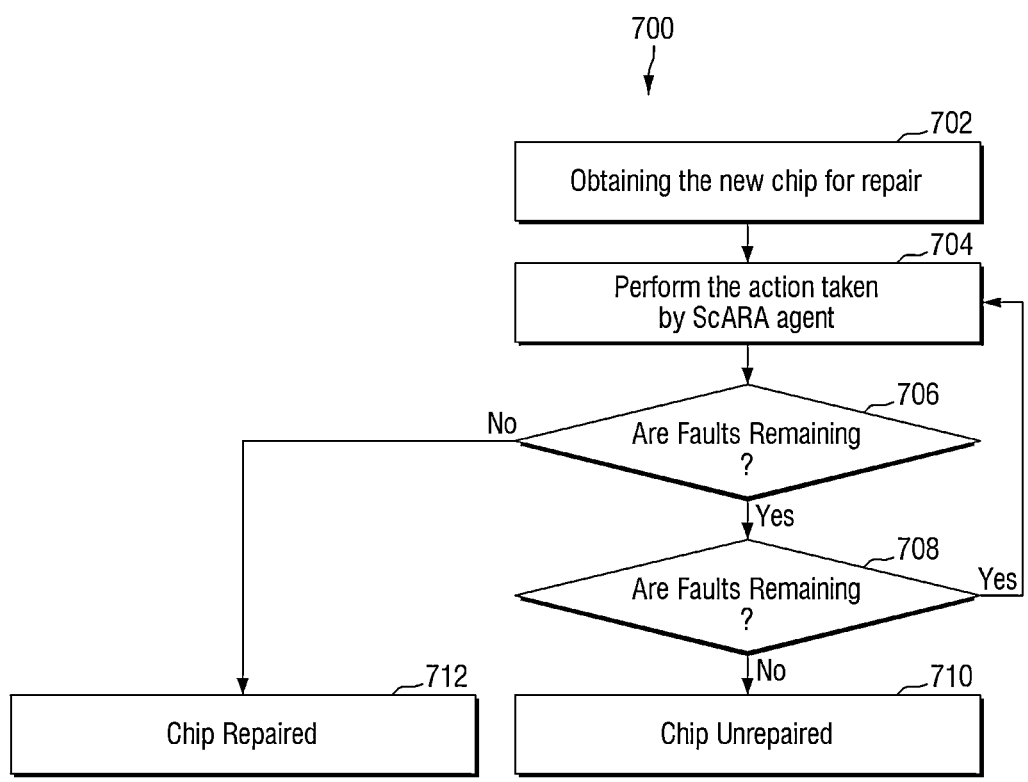
FIG. 7 is a flow chart illustrating a testing process for repairing a memory element in a memory device, according to some embodiments.

FIG. 7 is a flow chart illustrating a testing process for repairing a memory element in a memory device, according to some embodiments. As shown in FIG. 7, a flow chart (700) includes operations (702-712) which are performed by the memory element repairing controller (340) with help of a data driven controller.

At step 702, the method includes obtaining a new chip for repair. At step 704, the method includes performing the action taken by the agent (e.g., SAZRA agent or the like). At step 706, the method includes determining whether faults are remaining. Upon determining the faults are remaining (step 706, Y), at step 708, the method includes determining whether the spares are remaining. Upon determining the faults are not remaining (step 706, N), at step 712, the method includes repairing the chip. Upon determining that spares are not remaining (step 708, N), at step 710, the method includes un-repairing the chip. Upon determining that spares are remaining (step 708), at step 704, the method includes performing the action taken by the agent.

Figure 8A:
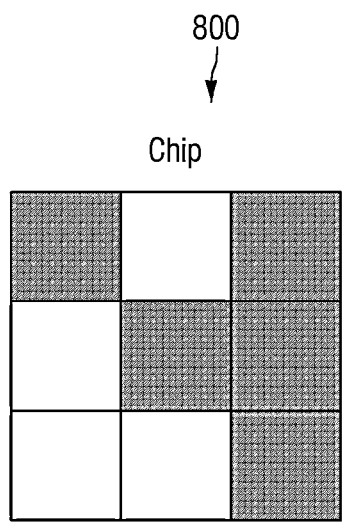
Figure 8B:
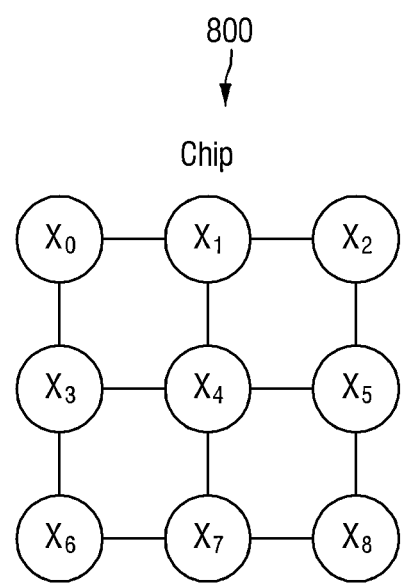

FIG. 8A-FIG. 8C are example illustrations in which an electronic device repairs a memory element in a memory device, according to some embodiments. In some embodiments, the example illustrations (800) illustrate a situation in which the electronic device (300) repairs the memory element in the memory device (350).

The method can be used to scale the RA approach AlphaRA to bigger chip sizes by training on smaller chip sizes. The SAZRA agent learns from its environment by combining Monte Carlo Tree Search (MCTS) and a Graph Isomorphism Network (GIN) iteratively for policy evaluation and improvement. For generating the faulty chips, a Statistical Error and Redundancy Analysis Simulator (SEARS) memory fault simulator can be used. In general, the SEARS is a simulator which uses statistical models for different stages of device manufacturing to generate defects on the chips similar to defects on the manufacturing line. The Redundancy Analysis has been formulated as a Markov Decision Process (MDP).

The memory chip is represented by the graph G(V, E) where V denotes a set of vertices, where each vertex corresponds to a cell in the memory chip and E denotes a set of edges, where each vertex is connected to a vertex on the left, right, top, and bottom, provided the vertices exist. |V|=N×N and |E|=4×N×(N−1). The vertex feature of each vertex is a vector of length 5 which consists of [If the cell is faulty, the proportion or degree of faults in the row, the proportion or degree of faults in the column, the proportion or degree of spare rows available, the proportion or degree of spare columns available].

The action space is a vector of length 2N where the first N elements correspond to selecting rows 0 to N−1 and the next N elements correspond to selecting columns 0 to N−1 for repair. When the faulty row or column is repaired, all the is in that line are zeroed out in s.

For a given state s, a first check is made if there are any faulty lines in the must repair condition. If so, the action set for s includes only the faulty lines in the must repair condition. Otherwise, the action set includes all the faulty lines in the chip. The reward is given to the SAZRA at the end of an episode, thus the reward structure is sparse. The reward is +1 if the agent successfully repairs the chip and −1 if the agent fails to repair the chip.

Through a self-play process over many episodes, the agent learns the policy to achieve a high repair rate. A self-play process episode includes the repair process of a single chip. In each iteration, a number of self-play episodes are carried out. For each time step t of repair, a number of MCTS simulations are performed starting from the current state st and an improved policy $\pi t$ is returned. The estimates obtained from MCTS are then used as new targets to subsequently train the GIN and get improved policy and value functions. The data generated from each time step t of a self-play episode is stored as a tuple (st, $\pi t$, z) where z is the reward at the end of the episode. The GIN f$\theta$, parameterized by $\theta$, is trained from the dataset collected from self-play. The GIN f$\theta$ takes the state of the chip (s) as input and has two outputs: a value of state (s) $\in$[−1, 1] and a vector of action probabilities p$\theta$(s). After the GNN is trained, the same chips from the validation set are provided to both the best and the current SAZRA agent and the result is determined based on some handcrafted rules. The next iteration of training starts after the contest phase.

In an example, using the GNN (e.g., Graph Isomorphism Network (GIN) or the like) allows the agent to scale to larger chip size. The GNN allows scaling because the GNN does not require a fixed number of vertices, so a theoretical scaling to arbitrarily large chips is possible provided the vertex feature dimension remains constant. The GNN uses a message passing procedure and at the end of the message passing, a scalar is obtained for each vertex. The scalars are aggregated to derive the policy and the value of the state.

The message passing is as illustrated:

$$h_v^{(k)} = MLP^{(k)}\left(h_v^{(k-1)} + \sum_{u \in N(v)} h_u^{(k-1)}\right) \quad (1)$$

$$m = CONCAT(\{h_v^k \mid v \in G\} \mid k = 0, 1, \ldots, K) \quad (2)$$

$$p = W_1^{2n \times n^2} m \quad (3)$$

$$v = w_2^T m \quad (4)$$

Where $h_v$ is the vertex feature, m is the result of the message passing and p and v are the policy and the value of the state, respectively. $W_1$ is a matrix and $w_2$ is a vector used to aggregate the result of the message passing to derive the policy and the value. K is the total number of message passing iterations.

The Graph Neural Networks (GNNs) take the graph and the input with node and edge features and compute a function that depends both on the features and on the graph structure. The message passing in the GNNs operate on the node features in the graph by propagating information between adjacent nodes. A related art GNN architecture comprises several layers, where message passing is carried out in between layers. Each node is updated on the basis of the aggregation function which is used to combine information from its neighboring nodes.

Replacing the Convolution Neural Network (CNN) in the AlphaRA framework with the GNN allows us to scale up to larger chip sizes. The method according to various embodiments uses a Graph Isomorphism Network (GIN) since its expressive power is equal to the Weisfeiler-Lehman graph isomorphism test. The state embedding $h_v^{(k)}$ denotes the embedding of node v at $k^{th}$ iteration of the message passing. A sum aggregator is used over all the neighboring nodes of v as shown in the second term of the input to the Multi-Layer Perceptron (MLP) in the equation (1). This is added to the previous state embedding of the node, $h_v^{(k-1)}$ to get an update state embedding. Once the message passing process is complete after K iterations, all node embeddings in iteration K are concatenated as shown in the equation (2).

The GIN used in the method according to various embodiments outputs both the policy p, which contains the probability of taking each action from the state, and the value v, which represents how useful the state is. After the message passing procedure is complete, the method according to various embodiments obtains a scalar for each node. These scalar values are concatenated to obtain a vector, as shown in the equation (2). Since the action set is of cardinality 2n (n is the number of rows and columns) where each action repairs entire faulty row or column, but m is of length $n^2$. Therefore, the method sums all the n row-wise and 2n column-wise node features, concatenate them and apply logsoftmax on the concatenated vector of length 2n, which gives the policy p of the state. For the value v of the state, the method takes mean of m and pass it through a tanh so that the output lies in the range [−1, 1]. $W_1$ and $w_2$ in equations (3, 4) respectively are chosen accordingly.

Figure 9A:
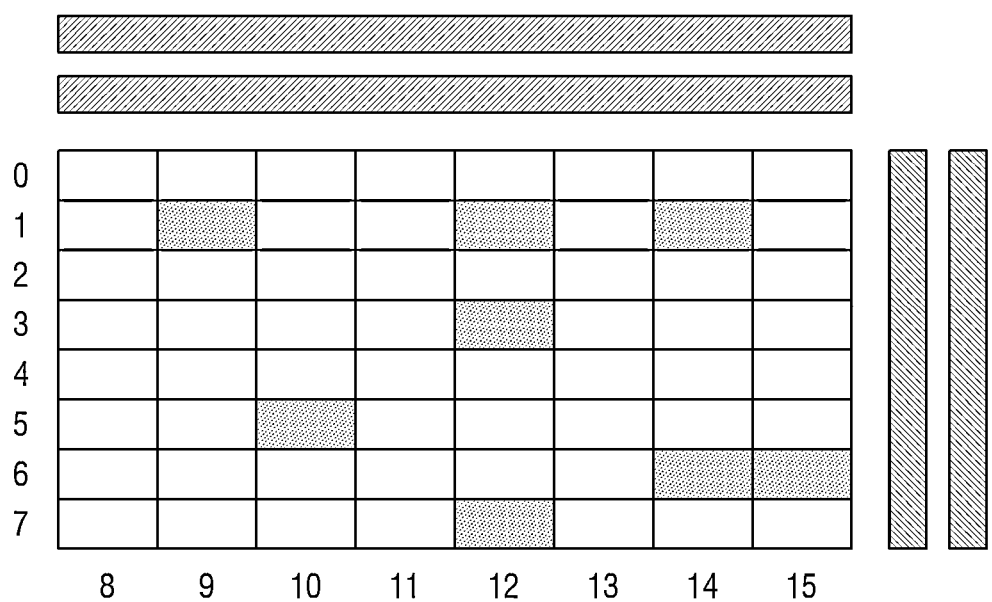
FIG. 9A-FIG. 9E are example illustrations in which an electronic device repairs a memory element in a memory device, according to some embodiments.
Figure 9B:
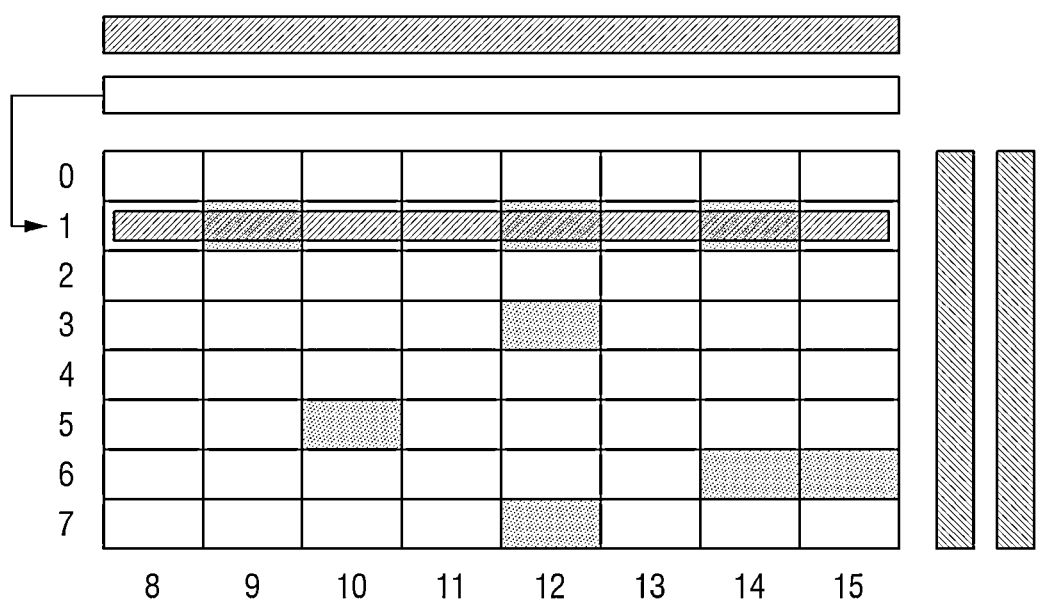
Figure 9C:
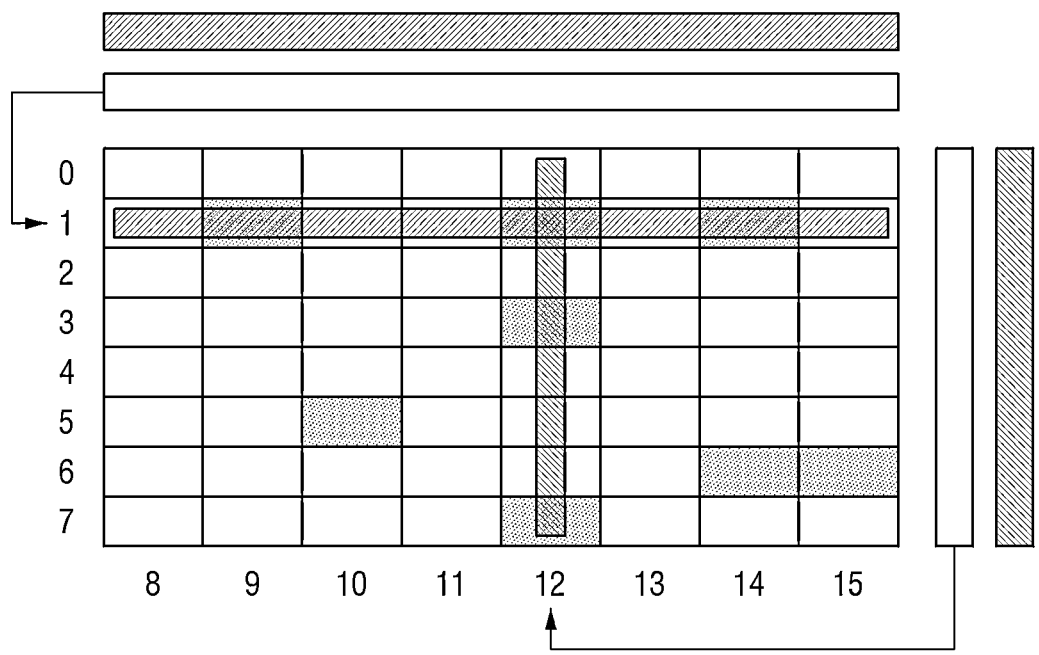
Figure 9D:
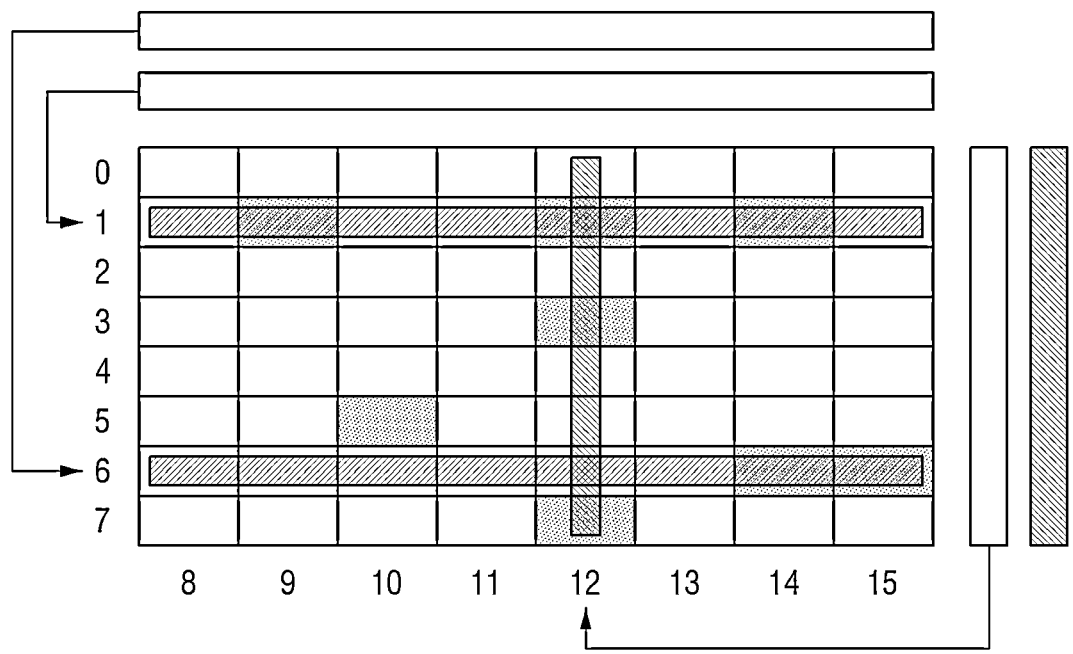
Figure 9E:
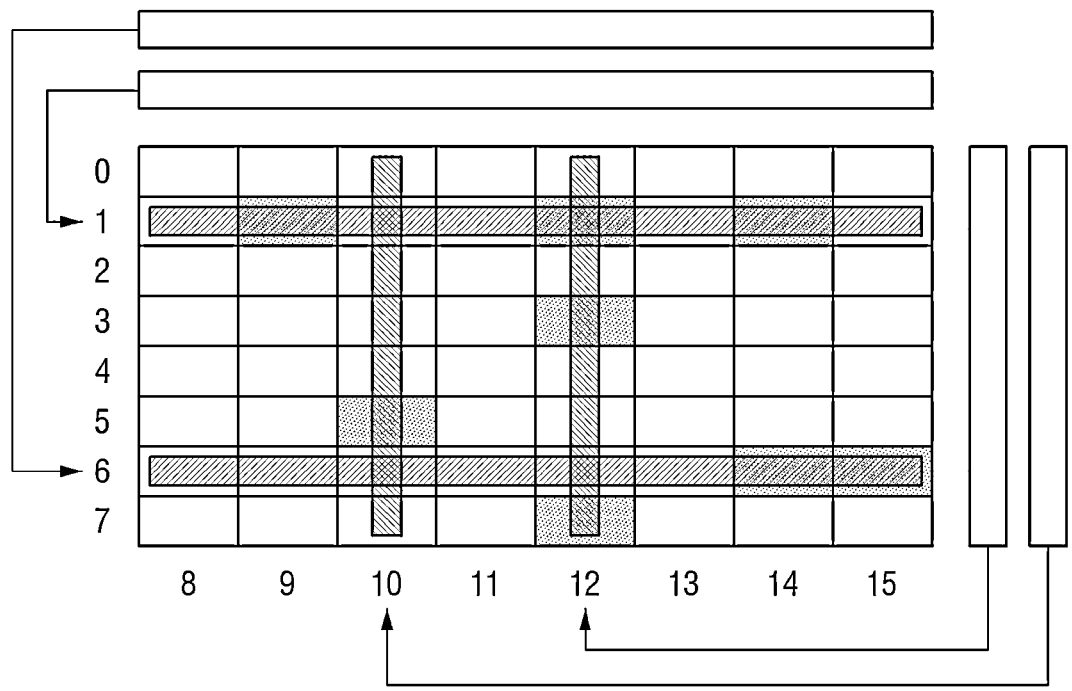

FIG. 9A-FIG. 9E are example illustrations in which an electronic device repairs a memory element in a memory device, according to some embodiments. In some embodiments, the example illustrations illustrate a situation in which the electronic device (300) repairs the memory element in the memory device (350). The action set is 0 to 15 where Actions 0 to 7 correspond to selection of Rows for Repair and where Actions 8 to 15 correspond to selection of Columns for Repair. FIG. 9A illustrates the initial chip state with Row 1 as a must-repair row and 12 as a must-repair column, Total faults=8. FIG. 9B illustrates Action taken on Row 1, Faults remaining=5. FIG. 9C illustrates Action taken on Column 12, Faults remaining=3. FIG. 9D illustrates Action taken on Row 6, Faults remaining=1 and FIG. 9E illustrates Action taken on Column 10, Faults remaining=0.

Figure 10:
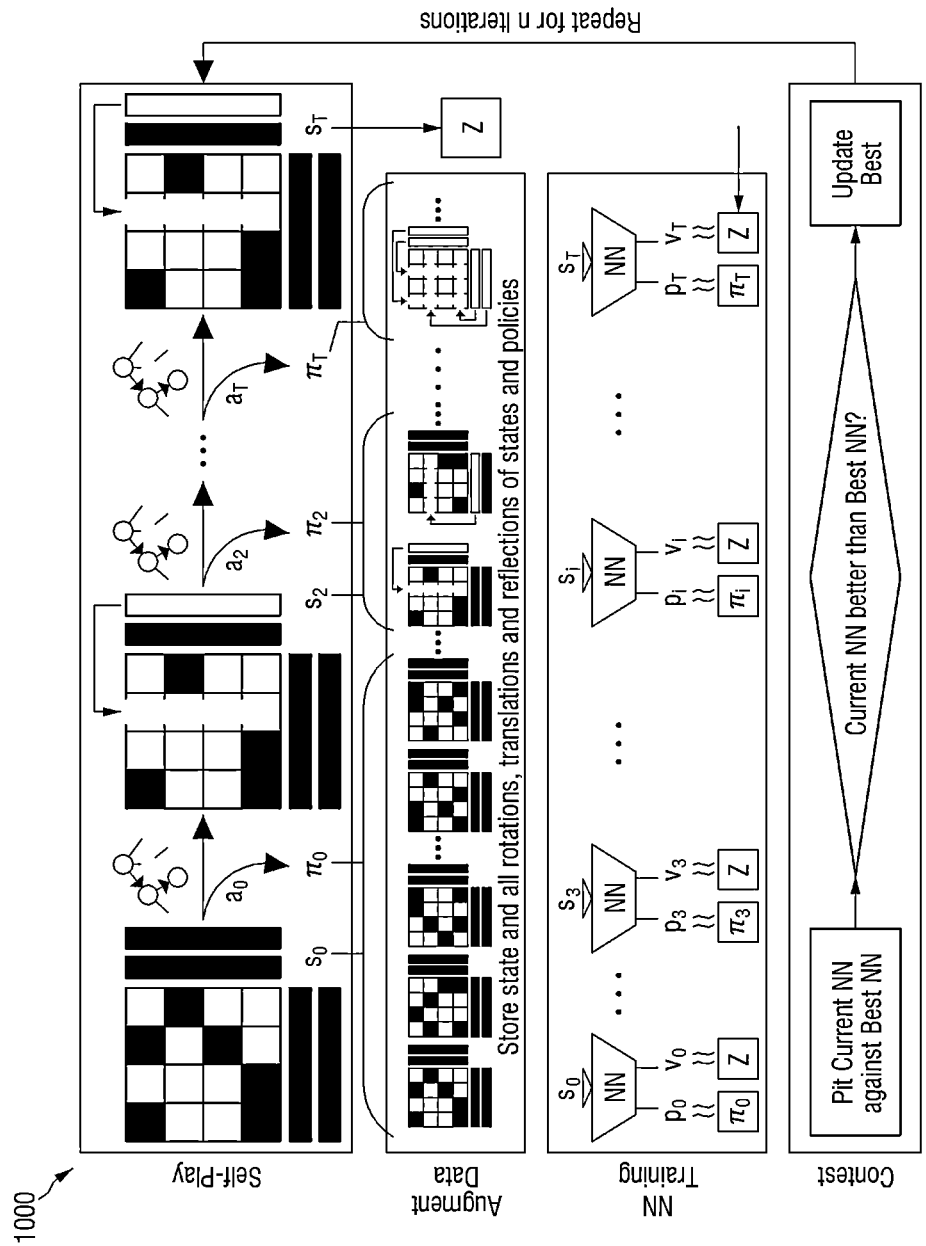
FIG. 10 depicts a Scalable AlphaRA (SAZRA) training process, according to some embodiments.

FIG. 10 depicts an SAZRA training process, according to some embodiments. An SAZRA training process (1000) comprises self-play, augmenting data, training the NN with the GNN (i.e., GIN) and holding a contest between the current GNN (i.e., current GIN) and the best GNN (i.e., best GIN) to determine the best results. The process is repeated for n iterations, wherein n is a pre-defined limit of iterations. In some embodiments, the SAZRA training process includes self-play, training the GNN and holding the contest between the current GNN and the best GNN to determine the best results. The process is repeated for n iterations, wherein n is a pre-defined limit of iterations.

The method according to various embodiments can be used to improve the efficiency of training by training just once on a smaller chip size and that model can be used for repair on bigger chip sizes. By using Graph Neural Networks in AlphaRA, the method can be trained on smaller DRAM chips and the strategies can be transferred to larger DRAM chips, without significant loss of yield. Further adding multithreaded MCTS and supervised training will enable scaling AlphaRA to the sizes of real DRAM chips.

The method according to some embodiments outperforms related art heuristic techniques in terms of Normalized Repair Rate (NRR) and Repair Rate (RR). $RR=C_{Repaired}/C_{Total}$ and $NRR=C_{Repaired}/C_{Repairable}$ where $C_{Repaired}$ is the number of chips repaired, $C_{Total}$ and $C_{Repairable}$ are the total number of chips and the number of theoretically repairable chips in the dataset respectively. The method utilizes the least total spare utilization compared to all the related art heuristic techniques.

The related art methods require data generation for every N, training and hyperparameter tuning for every N, and thus training becomes a tedious task. In the method according to some embodiments, only one-time training on a smaller N size (16) is performed and the results have been shown on different values of N (16, 32, 64, 128, 256, 512) which is 32 times larger. Thus, cumulative training time and effort is reduced from the order of weeks to days.

Embodiments herein can be useful in the following ways:
a. Training data need not be generated for all values of N. A trained model on a smaller N, can predict on much larger N sizes. It has been tested on N size which are larger up to 32 times.
b. Generated data need not be augmented.
c. Lesser number of MCTS simulations to achieve comparable repair rate with AlphaRA, thus lesser execution time.

d. Memory footprint of the Neural Network is in KBs which is a big improvement from previous implementations of RA where the Network size was in MBs Overall training time and effort is hugely reduced since training needs to be done only once for a particular N size (16 in this case). Effort for tuning/hyperparameter tuning is greatly reduced. The method according to some embodiments has better memory utilization effect and execution times.

The embodiments disclosed herein can be implemented through at least one software program running on at least one hardware device and performing network management functions to control the elements. The elements can be at least one of a hardware device, or a combination of hardware device and software module.

The various actions, acts, blocks, steps, or the like in the flow charts (400-700) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various embodiments, those skilled in the art will recognize that the various embodiments herein can be practiced with modification within the spirit and scope of the embodiments as described herein and the appended claims.

We claim:

1. A method comprising:
configuring, by an electronic device, a memory element as a graph with at least one vertex and at least one edge, at least one node associated with the memory element being encoded with information of at least one of a fault, a degree of the fault in a row of the memory element, a degree of the fault in a column of the memory element, a degree of spare rows available in the memory element, and a degree of spare columns available in the memory element;
determining, from the graph by the electronic device, a repair policy using a probability distribution over at least one of a faulty line and a non-faulty line as predicted by a graph neural network (GNN) based on a final node feature value from message passing stages of the GNN; and
determining, by the electronic device, a value of a state using a probability of the memory element being repaired from a particular state based on a global mean of all final node feature values predicted by the GNN.

2. The method as claimed in claim 1, further comprising:
generating, by the electronic device, a dataset for training the GNN by performing self-play events;
determining, by the electronic device, a new state based on an action and re-computing the repair policy until spare rows available in the memory element and spare columns available in the memory element are exhausted or until a number of faults in the memory element is zero;
selecting, by the electronic device, a trained neural network from a plurality of trained neural networks using a set of custom rules, the set of custom rules being based on a number of memory elements repaired in a validation dataset and a number of spares used by each competing neural network;
detecting, by the electronic device, faulty rows and faulty columns using the trained neural network that is selected; and
mapping the faulty rows and the faulty columns to the spare rows and the spare columns that are available to repair the memory element.

3. The method as claimed in claim 1, wherein determining the repair policy comprises:
generating a dataset for training the GNN by performing self-play events using a Monte Carlo Tree Search (MCTS) over a plurality of training iterations;
training the GNN from the dataset, an input to the GNN being a state of the memory element and at least one output being provided by the GNN; and
determining the repair policy using the probability distribution over the at least one of the faulty line and the non-faulty line as predicted by the GNN that has been trained.

4. The method as claimed in claim 3, wherein the dataset includes at least one of the state of the memory element, a policy associated with the memory element, and a value associated with the memory element.

5. The method as claimed in claim 3, wherein the at least one output from the GNN comprises a value of a state and a vector of action probabilities, or a policy of length.

6. The method as claimed in claim 1, wherein configuring the memory element comprises:
detecting at least one faulty row and at least one faulty column to be repaired in the memory element; and
configuring the memory element as the graph with the at least one vertex and the at least one edge, based on the at least one faulty row and the at least one faulty column.

7. The method as claimed in claim 1, wherein the repair policy is determined by using a Monte Carlo Tree Search (MCTS) and the GNN.

8. An electronic device comprising:
a processor;
a memory; and
a memory element repairing controller coupled with the processor and the memory, the memory element repairing controller configured to at least:
configure a memory element as a graph with at least one vertex and at least one edge, at least one node associated with the memory element being encoded with information of at least one of a fault, a degree of the fault in a row of the memory element, a degree of the fault in a column of the memory element, a degree of spare rows available in the memory element, and a degree of spare columns available in the memory element;
determine, from the graph, a repair policy using a probability distribution over at least one of a faulty line and a non-faulty line as predicted by a graph neural network (GNN) based on a final node feature value; and
determine a value of a state using a probability of the memory element being repaired from a particular state based on a global mean of all final node feature values predicted by the GNN.

9. The electronic device as claimed in claim 8, wherein the memory element repairing controller is further configured to:
- generate a dataset for training the GNN by performing self-play events;
- determine a new state based on an action taken, and re-computing the repair policy until spare rows available in the memory element and spare columns available in the memory element are exhausted or until a number of faults in the memory element is zero;
- select a trained neural network from a plurality of trained neural networks using a set of custom rules, the set of custom rules being based on a number of memory elements repaired in a validation dataset and a number of spares used by each competing neural network; and
- detect faulty rows and faulty columns using the trained neural network that is selected; and
- mapping the faulty rows and the faulty columns to spare rows and spare columns available to repair the memory element.

10. The electronic device as claimed in claim 8, wherein to determine the repair policy, the memory element repairing controller is further configured to:
- generate a dataset for training the GNN by performing self-play events using a Monte Carlo Tree Search (MCTS) over a plurality of training iterations;
- train the GNN from the dataset, an input to the GNN being a state of the memory element and at least one output being provided by the GNN; and
- determine the repair policy using the probability distribution over the at least one of the faulty line and the non-faulty line as predicted by the GNN that has been trained.

11. The electronic device as claimed in claim 10, wherein the dataset includes at least one of the state of the memory element, a policy associated with the memory element, and a value associated with the memory element.

12. The electronic device as claimed in claim 10, wherein the at least one output from the GNN comprises a value of a state and a vector of action probabilities, or a policy of length.

13. The electronic device as claimed in claim 8, wherein to configure the memory element as the graph, the memory element repairing controller is further configured to:
- detect at least one faulty row and at least one column to be repaired in the memory element; and
- configure the memory element as the graph with the at least one vertex and the at least one edge based on the at least one faulty row and the at least one column.

14. The electronic device as claimed in claim 8, wherein the repair policy is determined by using a Monte Carlo Tree Search (MCTS) and a GNN.

15. A method comprising:
- detecting, by an electronic device, at least one faulty row and at least one column to be repaired in a memory element;
- configuring, by the electronic device, the memory element as a graph comprising a plurality of nodes, each node representing a cell of the memory element and being formed by at least one vertex and at least one edge of the graph, at least one of the plurality of nodes being encoded with information of at least one of a fault, a degree of the fault in a row of the memory element, a degree of the fault in a column of the memory element, a degree of spare rows available in the memory element, and a degree of spare columns available in the memory element;
- determining, from the graph by the electronic device, a repair policy using a probability distribution over at least one of a faulty line and a non-faulty line as predicted by a graph neural network (GNN) based on a final node feature value;
- determining, by the electronic device, a value of a state using a probability of the memory element being repaired from a particular state based on a global mean of all final node feature values predicted by the GNN; and
- repairing, by the electronic device, the memory element in a memory device based on the information.

* * * * *